June 9, 1936.  W. O. DERRY, SR  2,043,609
ARTIFICIAL MOUSE BAIT
Filed Aug. 23, 1934
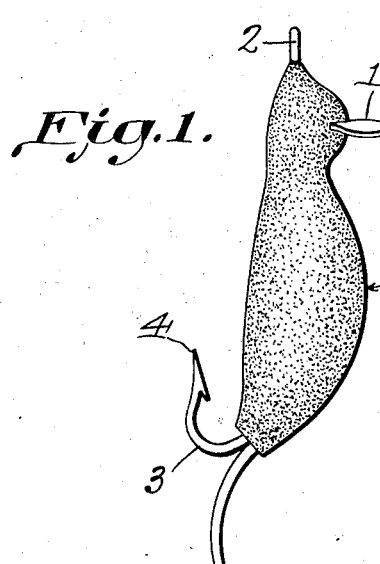
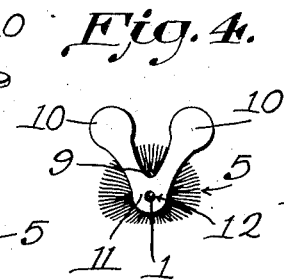
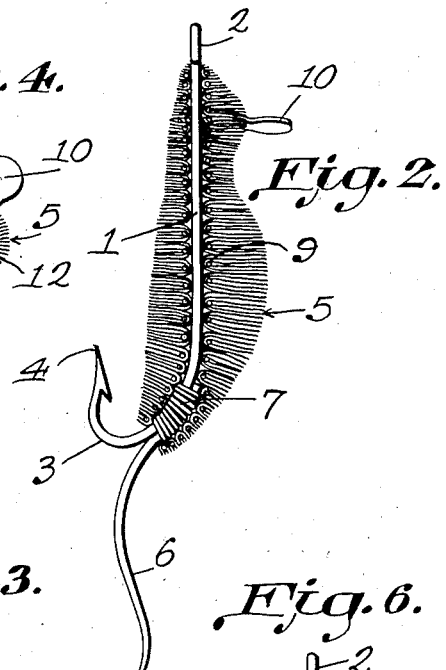
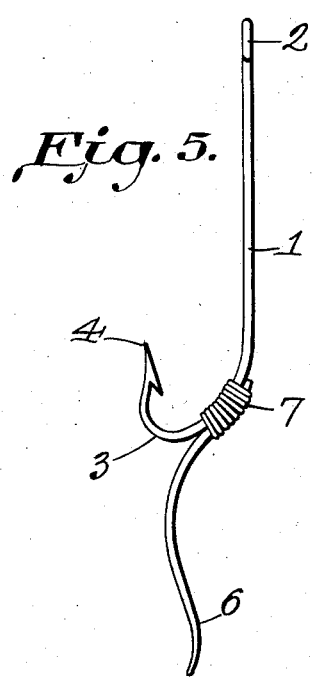
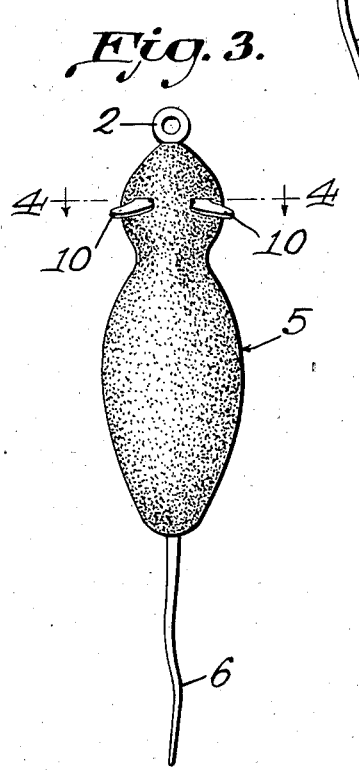
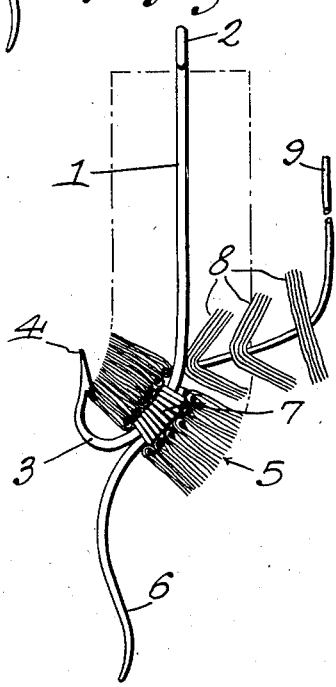
W. O. Derry, Sr. Inventor
By C. A. Snow & Co.
Attorneys.

Patented June 9, 1936

2,043,609

UNITED STATES PATENT OFFICE 2,043,609

ARTIFICIAL MOUSE BAIT

Willis O. Derry, Sr., Ypsilanti, Mich.

Application August 23, 1934, Serial No. 741,156

1 Claim. (Cl. 43—48)

The device forming the subject matter of this application is a fish bait, and one object of the invention is to provide a device of the class described, wherein the body of the bait is fashioned from deer hair. Another object of the invention is to provide novel means for connecting the body to the hook. A further object is to improve the construction of the tail and the ears, and to supply novel means for assembling them with the hook and with the body.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing, Fig. 1 shows, in side elevation, a bait constructed in accordance with the invention; Fig. 2 is a longitudinal section; Fig. 3 is a top plan of the bait; Fig. 4 is a cross section on the line 4—4 of Fig. 3; Fig. 5 is an elevation of the hook, the tail being connected thereto; and Fig. 6 is a diagrammatic view relating to the method of attaching the body to the hook.

In carrying out the invention, there is provided a metal fish hook, which may be of any desired construction, the hook being shown as comprising a shank 1 having an eye 2 at its forward end, and equipped with the usual bend 3, the bend terminating in a barbed point 4. The hook, however, may be of any desired construction.

The body 5 of the bait is shaped to simulate the appearance of some animal, preferably a mouse. The body 5 is formed from stranded material, deer hair being preferred, that material being water-proof, buoyant, and light in weight. The body 5 will not become water-soaked, and will float indefinitely on the surface of the water. The device, owing to its lightness, can be used in connection with the most delicate fly rod. The bait is not confined to use in fly fishing, but, if made in appropriate sizes, may be used for taking any fish that will be attracted by it, such as bass and the members of the pike family. Deer hair is preferred in making the body 5 for the reason that deer hair is hollow, and when attached to the hook by a binder, as hereinafter described, will automatically double across the binder, as binder tension is applied.

The tail 6 is flexible, and may be formed of buckskin, although the use of that material is not insisted upon. The tail 6 is secured to the bend 3 of the hook by a winding 7 of linen thread, silk thread or the like, which may be waxed or shellaced.

The deer hair that makes up the body 5 may be gathered together in small tufts 8, and laid across a flexible binder 9, which may be linen or silk thread, or anything suitable for the purpose, the rear end of the binder being made fast to the bend 3 of the hook. The binder 9, with the tufts 8 disposed across it, is wound spirally around the hooks, the tufts being compacted together transversely as the winding progresses. Because hollow or tubular deer hair is used, the hairs tend to crush where the binder crosses them, and the tufts tend to double across the binder, the ends of each tuft being brought together. The binder 9, like the winding 7, may be waxed, shellacked, or treated otherwise, and may be either single or double. Silk, linen or the like may constitute the material from which the binder is made.

The ears 10 diverge and are joined at their inner ends by a disk-like hub 11, having an opening 12. The structure is flexible and resilient, and may be made of rubber. Some other material may be employed.

After the body 5 has been partially completed, the ear structure, being resilient, is stretched to enlarge the hole 12 therein and is slipped over the forward or eye end of the hook and is pushed back against the end of the partially completed body, the shank 1 of the hook being received in the opening 12 of the ear structure. The binder 9 is carried through the crotch formed by the ears 10, as in Fig. 4, and more deer hair is applied to the shank 1 of the hook, by the process hereinbefore described until the body 5 is completed to a point as close to the forward end of the shank of the hook as is desired. The forward end of the binder 9 is secured to the forward end of the shank 1 of the hook, and the deer hair is sheared off at its outer end, to give the body 5 the desired contour.

I claim:

A fish lure comprising a hook-carrying shank, an ear of resilient material, through which the shank passes, a body made of tufts of strands, and a binder extended across the intermediate portions of the tufts, the tufts being folded across the binder, the binder being wound spirally about the shank to hold the tufts thereon, the shank being bare, to facilitate the insertion of the shank through the ear and to enable the tufts to slip back easily on the shank and thus facilitate a compacting of the tufts as the binder is wound.

WILLIS O. DERRY, Sr.